United States Patent
Zhang

(10) Patent No.: US 7,525,950 B1
(45) Date of Patent: Apr. 28, 2009

(54) CALLING CARD SYSTEM FOR VOICE AND DATA TRANSMISSION OVER A PUBLIC NETWORK

(75) Inventor: Yi Zhang, Austin, TX (US)

(73) Assignee: SBC Properties, L.P., Reno, NV (US)

( * ) Notice: Subject to any disclaimer, the term of this patent is extended or adjusted under 35 U.S.C. 154(b) by 1500 days.

(21) Appl. No.: 10/283,512

(22) Filed: Oct. 30, 2002

(51) Int. Cl.
H04L 12/66 (2006.01)
(52) U.S. Cl. ............... 370/352; 370/356; 379/144.01
(58) Field of Classification Search ......... 370/352–356; 379/144.01, 1
See application file for complete search history.

(56) References Cited

U.S. PATENT DOCUMENTS

| | | | |
|---|---|---|---|
| 5,749,075 | A | 5/1998 | Toader et al. |
| 5,867,495 | A | 2/1999 | Elliott et al. |
| 5,966,431 | A | 10/1999 | Reiman et al. |
| 5,991,380 | A | 11/1999 | Bruno et al. |
| 6,185,415 | B1 | 2/2001 | Boatwright |
| 6,233,234 | B1 | 5/2001 | Curry et al. |
| 6,252,952 | B1 | 6/2001 | Kung et al. |
| 6,289,010 | B1 | 9/2001 | Voit et al. |
| 6,337,858 | B1 | 1/2002 | Petty et al. |
| 6,359,880 | B1 | 3/2002 | Curry et al. |
| 6,363,065 | B1 | 3/2002 | Thornton et al. |
| 6,381,316 | B2 | 4/2002 | Joyce et al. |
| 6,404,870 | B1 | 6/2002 | Kia et al. |
| 2002/0029189 | A1 | 3/2002 | Titus et al. |
| 2002/0061740 | A1 | 5/2002 | Lautenschlager et al. |
| 2002/0091601 | A1 | 7/2002 | Fellingham et al. |

FOREIGN PATENT DOCUMENTS

EP 1 059 798 A2 12/2000
WO WO 01/55861 A1 8/2001

OTHER PUBLICATIONS

"BV1250 VoIP Gateway," <http://www.okint.com/01_07.html> (4 pages).
"VoIP Gateway," <http://www.vic-corp.com/voip.html> (2 pages).
"VoIP Gateways," Andy Green, Jun. 5, 2002 <http://www.cconvergence.com/article/CTM20020603S0001> (10 pages).

*Primary Examiner*—Suhan Ni
(74) *Attorney, Agent, or Firm*—Brinks Hofer Gilson & Lione

(57) ABSTRACT

A calling card system includes a public switched telephone network (PSTN) and a service selection gateway. The PSTN may receive calls from communication devices that may be either voice communication or data communication. The calls may be forwarded to the service selection gateway based on a calling card access number that is included in the call. Calls that are voice communication may be transferred to the PSTN or to a public network by the service selection gateway. The service selection gateway may provide voice communication transferred to the public network in a voice based network protocol such as VoIP that is transmittable over the public network. Calls that are data communication may be selectively transmitted over the public network in a data network protocol with the service selection gateway.

16 Claims, 8 Drawing Sheets

CALLING CARD SYSTEM FOR VOICE AND DATA TRANSMISSION OVER A PUBLIC NETWORK

TECHNICAL FIELD OF THE INVENTION

The present invention relates generally to calling card services and, more particularly, to pre-paid and/or post paid calling card services provided by a calling card system capable of voice and data transmission over a public network.

BACKGROUND OF THE INVENTION

Traditional voice calling card services are well known. In general, these services may be used to reduce communication costs and manage call accounting records. As the landscape of telecommunications changes, retail pre-paid calling cards have become very popular in certain market segments, especially for international calling. One reason for this popularity is due to the significantly higher long distance calling rates for international calls when compared to national long distance calling rates for private subscriber accounts. With the success of the Internet, Voice over IP (VoIP) has become the dominant communication mechanism for pre-paid international long distance calling services.

One popular form of access to the Internet is with dial up Internet services. Although use of broadband Internet access is becoming more widespread, a significant number of users still access the Internet via dial-up modems. In general, the basic requirements for dial-up access are an account with an Internet service provider (ISP) and an analog phone line. To get an account, an ISP will typically require subscribers to have some credit history and a willingness to enter a monthly or yearly dial-up access service contract.

Those individuals interested in access to the Internet who cannot, or are unwilling, to get an account may be denied such access. In addition, such accounts are usually accessed with a local dial-up number that incurs long distance charges when accessed while traveling. Further, access to an account may be difficult when using Internet compatible devices not owned by the owner of the account.

Accordingly, a system is needed to provide a calling card-like offering for not only voice telephony services but also access public networks such as the Internet.

DETAILED DESCRIPTION

The present invention relates to a calling card system that provides both voice and data communication with a calling card. The calling card may be a post paid or a pre-paid calling card that a user may utilize in conjunction with a communication device. The user may place a call to a public switched telephone network (PSTN) with the calling card. The PSTN may automatically route calls to a service selection gateway. The service selection gateway may authenticate the identity of the communication device user and determine whether the call is voice communication or data communication. Voice communication may be routed over a public network in a voice based network protocol such as voice over Internet Protocol (VoIP) with the service selection gateway. Alternatively, the service selection gateway may transfer the call back to the PSTN for routing over the switched network. Data communication also may be selectively transmitted over the public network with the service selection gateway in a data network protocol.

When the user is authenticated to be a member, such as an employee, of a private communication system, such as a corporate communication network, the service selection gateway may also provide virtual private network services. Following authentication and determination of whether the call is voice or data communications, the call may be securely tunneled through the public network to the private communication system by the service selection gateway. Both data communication and voice communication may be securely tunneled through the public network by the service selection gateway. Upon reaching the private communication system, the user may be authenticated with the infrastructure of the private communication system. Following authentication, the communication device operated by the user may be treated as a device within the private communication system. Accordingly, the user may access and utilize services and data available on the private communication system as if the user were operating a device while physically located within the private network.

Figure 1:
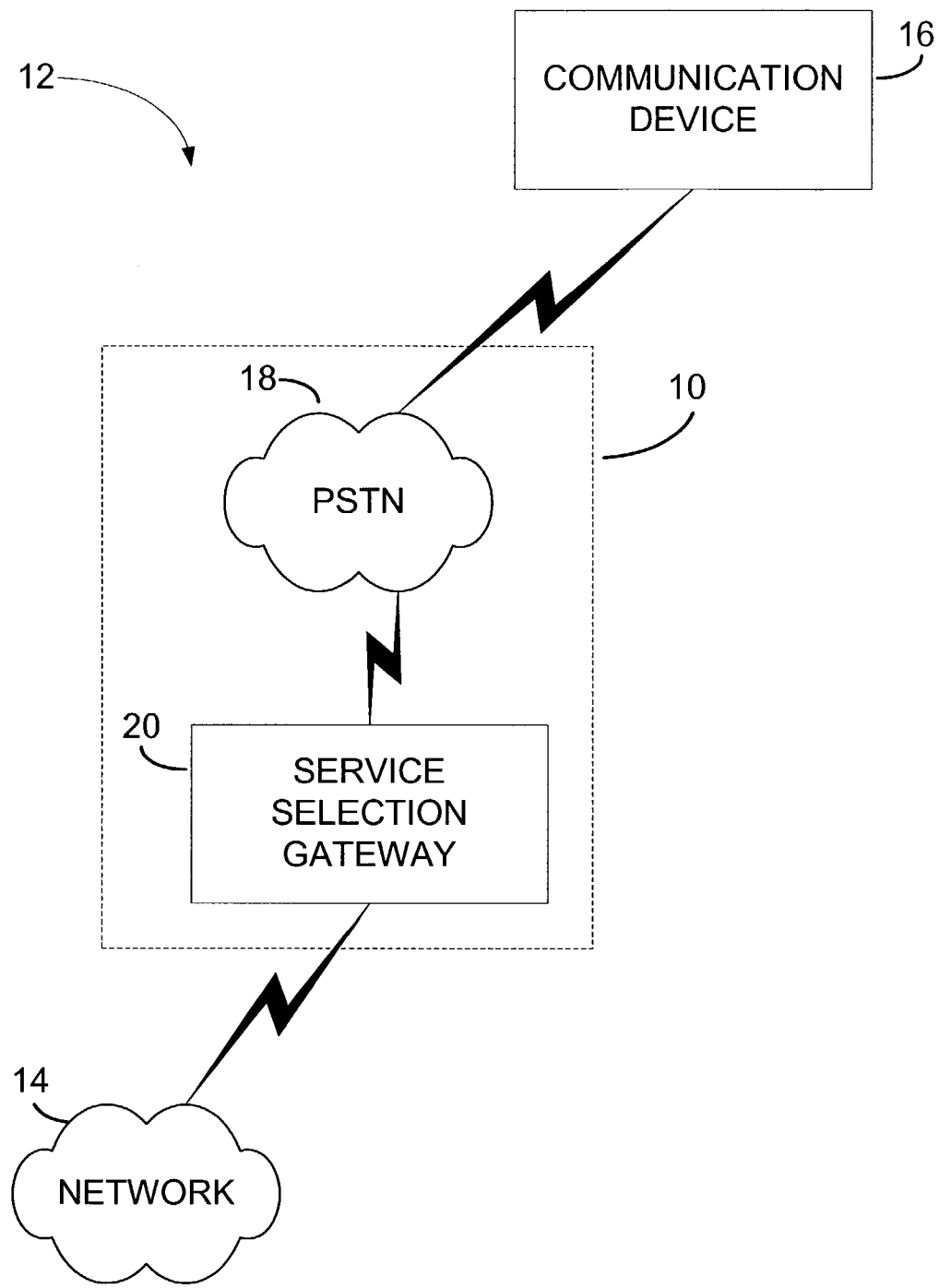
FIG. 1 is a block diagram of a communication system that includes a calling card system.

FIG. 1 is a block diagram of a calling card service 10 within an example communication system 12. In addition to the calling card system 10, the communication system 12 also includes at least one network 14 and at least one communication device 16 coupled with the calling card system 10. In other examples, the communication system 12 may include any number of networks and devices. As used herein, the term "coupled", "connected", or "interconnected" may mean electrically coupled, optically coupled, wirelessly coupled and/or any other form of coupling providing an interface between systems, devices and/or components.

The network 14 may include the Internet, a public intranet, a private intranet, an extranet and/or any other form of public and/or private local area network (LAN) and/or wide area network (WAN) configuration. The transfer of data, voice and commands may be enabled by the network 14 via wireless, fiber optic and/or wireline communications. Communication within the network 14 may be with any network protocol, such as an Internet protocol (IP).

The communication device 16 may be any type of device(s) capable of communication over the network 14. In addition, the communication device 16 may include a user interface (UI), memory, a microprocessor and/or any other hardware and associated operating systems/applications. For example, the communication device 16 may be a wireless device, such as, a wireless phone, a personal digital assistant (PDA), a pocket personal computer (PC) or any other device capable of wireless communication. In addition, the communication device 16 may be wireline device, such as, for example, a wireline phone, a network terminal, a personal computer, a server computer or any other device capable of wireline communication over the network 14. Further, the communication device 16 may include both wireline and wireless communication capabilities.

The calling card system 10 includes at least one public switched telephone network (PSTN) 18 and at least one service selection gateway 20. In actual implementation, the calling card system 10 may include any number of public switched telephone networks cooperatively communicating with any number of service selection gateways.

The PSTN 18 may be any form of analog based communication system for carrying voice, data and any other related telephone services in support of subscriber connection. Telephone services carried by the PSTN 18 may generally be referred to as plain old telephone service (POTS). In general, communication within the PSTN 18 may be over a wireline based system utilizing switching devices such as a time division multiplexing (TDM) switch. As used herein, the term "data" or "data communication" refers to signals that originate from some type of computing device as digital information that may be communicated over analog and/or digital systems and networks to another computing device or user. The term "voice" or "voice communication", on the other hand, refers to signals that originate as sound and may be converted to analog and/or digital signals and communicated over analog and/or digital systems and networks to another user and/or device.

The service selection gateway 20 may be any computing device capable of communication with both the network 14 and the PSTN 18. Communication with the PSTN 18 may involve analog communication of voice and data. Communication with the network 14 may involve communication of digital voice and data communication utilizing a network protocol, such as an Internet protocol (IP). The service selection gateway 20 may include one or more processors, user interface devices, memory storage devices, etc. located locally or remotely. The memory storage devices may include magnetic, optic, electronic or any other form of data storage.

Stored within the memory storage device(s) may be data and instructions to operate the service selection gateway 20. Functionality within the service selection gateway 20 may also include hardware and/or instructions stored in the memory storage device(s) to manage voice and data communication as well as administer operation of the calling card system 10. In addition, the service selection gateway 20 may include instructions stored in the memory storage device(s) to perform usage tracking, reporting, billing, security etc. Further, instructions stored in the memory device(s) may create, maintain and access data in the form of user accounts for users of the calling card system 10. The user accounts may be in the form of a relational database or any other data organization technique.

During operation, a user of the communication device 16 may communicate with the PSTN 18 by placing a call utilizing a pre-paid or post paid calling card. As used herein, the term "call" refers to obtaining a dial tone from the PSTN 18 and dialing a called number indicative of a destination. Similar to conventional calling cards, the calling card may include a calling card access number in the form of a phone number such as a toll-free or local phone number to access the calling card system 10. In addition, identifying information such as a personal identification number (PIN), biological recognition (e.g. voice, retina, fingerprint, etc.) and/or any other form of authentication of the identity of the user may be associated with each calling card. For example, pre-paid calling cards may include an access number and PIN printed on each card. Post-paid calling numbers, on the other hand, may include only the access number printed on the card.

Upon receiving a call made with a calling card access number, the PSTN 18 may forward the call to the service selection gateway 20 based on the access number. The service selection gateway 20 may answer and process the call to authenticate the user. Authentication may involve the user submitting identifying information associated with the calling card to the service selection gateway 20, such as, a PIN number, biological information, a password, etc. Following authentication, the service selection gateway 20 may determine if the call involves voice communication or data communication. Where the call is identified as data communication, the service selection gateway 20 may enable transmission of the data over the network 14 to a requested destination with a data network protocol, such as an Internet protocol (IP), Telnet, POP3, Multipurpose Internet mail extension (MIME), secure HTTP (S-HTTP), point-to-point protocol (PPP), simple mail transfer protocol (SMTP), proprietary protocols, or any other network protocols known in the art.

Calls identified as voice communication may be enabled for transmission over the network 14 by the service selection gateway 20 in a voice based network protocol, such as Internet telephony, voice-over-IP or any other network compatible protocol capable of supporting voice transmission. Alternatively, the call may be hairpinned back to the PSTN 18 by the service selection gateway 20 for transmission through the PSTN 18. Selection by the service selection gateway 20 of the transmission mechanism for voice communications may be based on availability, network bandwidth, cost, services requested by the user or any other consideration relevant to making such a selection.

For data and voice communication over the network 14, the service selection gateway 20 may also perform additional processing based on the user of the calling card and the destination of the communication. Additional processing may involve providing the voice or data communication a secure communication path over the network 14 to an identified predetermined destination. The identified predetermined destination may be a private network within the network 14 such as the communication network of a corporation. A user may utilize the service selection gateway 20 to obtain secure access to the private network. Within the private network, the user may be authenticated. Following authentication, the communication device 16 may utilize the resources within the private network as a device would that is physically located within the private network.

Figure 2:
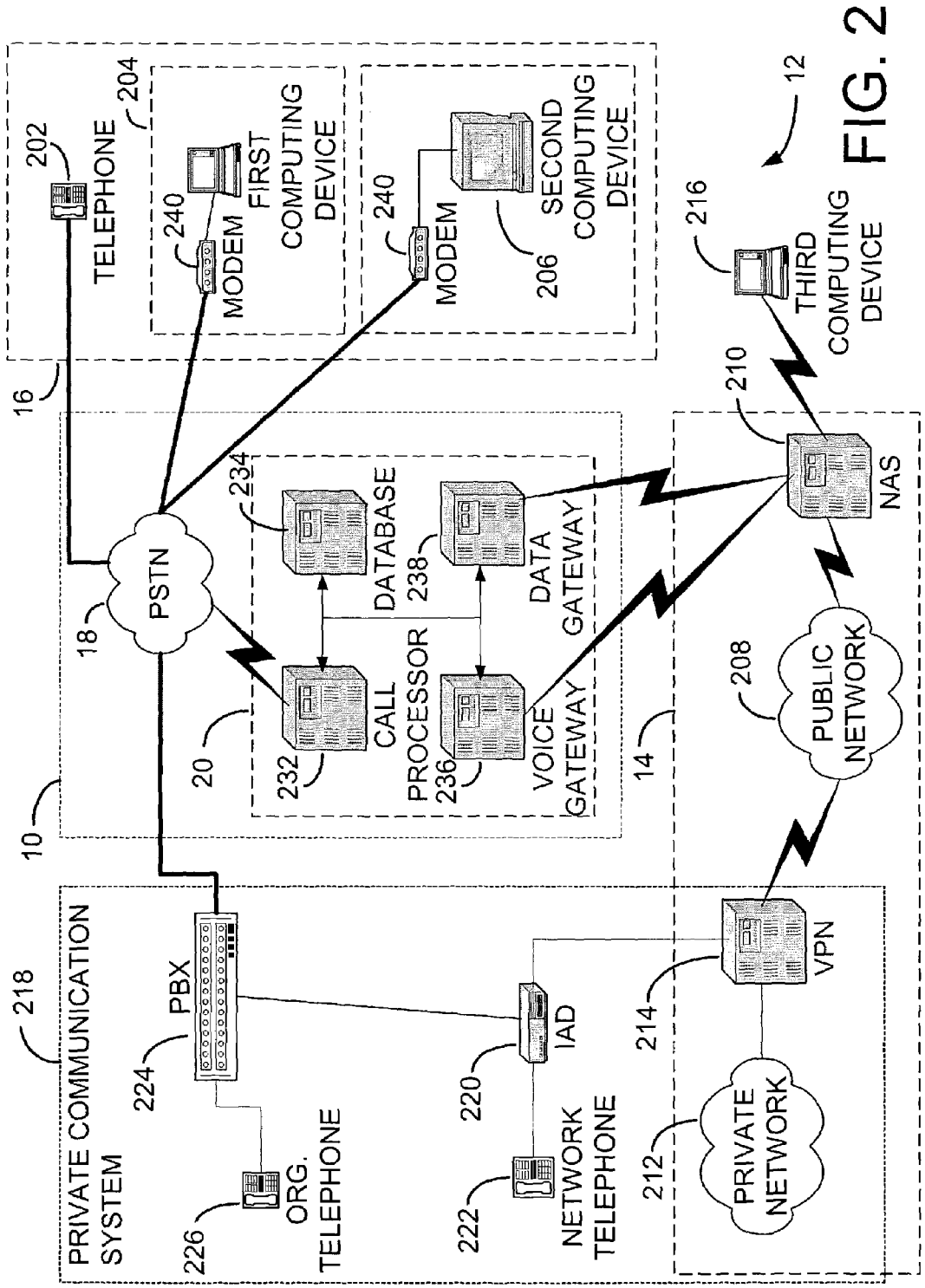
FIG. 2 is a more detailed block diagram of a communication system that includes the calling card system of FIG. 1.

FIG. 2 is a more detailed block diagram of the calling card system 10 within an example communication system 12. Similar to the previous example, the communication system 12 includes at least one communication device 16 illustrated as a telephone 202, a first computing device 204 and a second computing device 206. In addition, the communication system 12 includes the network 14 that, in this example, includes a public network 208, a network access server (NAS) 210, a private network 212 and a virtual private network (VPN) server 214. Further, the communication system 12 may include at least one third computing device 216 coupled with the public network 208 with, for example a broadband connection. In other examples, any number of other devices, networks and systems may be included in the communication system 12.

The public network 208 may include any networks accessible to the public, such as the Internet. The NAS 210 may be any system or device capable of providing a gateway for accessing the public network 208. For example, the NAS 210 may be operated by an Internet Service Provider (ISP) to provide access to the Internet. The private network 212 may be a secure voice and data network, such as a LAN or a WAN within a private communication system 218. The private communication system 218 may be operated and maintained by a private organization, such as a corporation or other business entity. Use of the private network 212 and private communication system 218 may be restricted to those users who are authorized, such as employees of the private organization.

The virtual private network (VPN) server 214 is included in the illustrated private communication system 218 to couple the public network 210 and the private network 212. The VPN server 214 may be any device capable of providing secure voice and data communications between the private communication system 218 and the public network 208. In addition, the private communication system 218 includes an integrated access device (IAD) 220 coupled with the VPN server 214. The integrated access device 220 may be any system or device capable of terminating calls that are voice communication transmitted over the public network 208 through the VPN server 214. The IAD 220 may also convert between voice based network protocols, such as VoIP, and voice based protocols compatible with the private communication system 218, such as analog or digital voice data. Although illustrated as two separate devices in FIG. 2, the VPN server 214 and the IAD 220 may be implemented as a single device.

Coupled with the illustrated integrated access device 220 is at least one network compatible telephone 222 and at least one private branch exchange (PBX) 224. The network compatible telephone 222 may be any device capable of processing calls that are voice communication transmitted in a network protocol such as IP (e.g. VoIP). The PBX 224 may be any form of private telephone system capable of receiving incoming calls and placing outgoing calls via either the PSTN 18 or the integrated access device 220. Coupled with the PBX 224 may be at least one organization telephone 226.

The organization telephone 226 may be a conventional telephone capable of providing digital or analog data representative of voice communication. As illustrated in FIG. 2, the organization telephone 226 may be physically located within the private communication system 218. The PBX 224 may provide a dial tone and place outgoing calls for the organization telephone 226, as well as terminate incoming calls at the organization telephone 226.

Referring still to FIG. 2, the calling card system 10 includes the PSTN 18 and the service selection gateway 20 as previously discussed. The service selection gateway 20 includes a number of modules identified as a call processor 232, a database 234, a voice gateway 236 and a data gateway 238. Operation of the modules may be based on instructions stored in a memory device(s) within the service selection gateway 20. In other examples, any number of modules may be identified to illustrate the functionality within the calling card system 10 of the service selection gateway 20.

The call processor 232 may provide user authentication, call classification, call routing, credit/debit authorization, accounting, etc. Capabilities within the call processor 232 may also include interactive voice response (IVR), tone detection and grooming capabilities. The IVR and tone detection may be selectively utilized to allow a user to place a voice call to the service selection gateway 20 and interact via voice commands with the IVR, or via keypad with the tone detection. Authentication, activation, user account information and selection of available communication services from the service selection gateway 20 may be accessible with the IVR and tone detection. User authentication, activation, account balances and any other user account related housekeeping may be handled by the call processor 232 in cooperation with the database 234.

The database 234 may include user account information, authentication information, account balances, call details and any other information associated with user accounts. The database 234 may be stored in a separate server accessible by the call processor 232, or may be included in the server operating the call processor 232. Authentication with the database module 234 may operate similar to a remote authentication dial in user service (RADIUS). Accounting information may include detailed accounting records maintained and accessed from the database 234 similar to a RADIUS accounting database. Alternatively, separate independent databases may be maintained and accessed for account related activities such as, for example, validation of user credit cards, user credit history, etc.

The grooming capabilities allow the call processor 232 to differentiate between voice and data communications. For call identified as voice communication, the call processor 232 may determine if the voice gateway 236 is available to deliver the call to a final destination identified by the user with IVR or tone detection. The voice gateway 236 may provide a gateway to and from the PSTN 18 to the public network 208 for voice communication. Voice communication may be transmitted in a network protocol such as VoIP over the public network 208 via the NAS 210 by the voice gateway 236. Alternatively, the voice gateway 236 may be directly coupled with the public network 208 without utilizing the NAS 210. When directed by the call processor 232, the voice gateway 236 may translate the voice communications into the network protocol and transmit the call over the network 14 to a destination identified with the call.

The data gateway 238 may similarly provide a gateway to the public network 208 for data communication to and from the PSTN 18. The call processor 232 may direct the data gateway 238 to terminate the call at the destination with a data network protocol, such as point-to-point protocol (PPP). Alternatively, where the data gateway 238 is not directly connected with the public network 208, the data gateway 238 may be directed to terminate the call with the NAS 210 using a data network protocol. Although illustrated as coupled with the NAS 210, the data gateway may also be illustrated as coupled directly with the public network 208.

The data gateway 238 may also enable data communication over the public network 208 by selectively identify the dial up phone number of an NAS 210 as an optimum dial in number. The dial up phone number of the NAS 210 may be provided to the user of the communication device 16 via the PSTN 18. The NAS 210 may be identified as optimum for direct dial up connection due to, for example, a closer proximity of the NAS 210 to the geographic location of the communication device user than the proximity of the service selection gateway 20. Accordingly, the dial up phone number may be a local phone number, thereby minimizing long distance charges for calls placed to the PSTN 18 for data communication over the public network 208.

As previously discussed, access to the calling card system 10 may be with any communication device 16 and a calling card. As an example, the telephone 202 illustrated in FIG. 2 may utilize POTS to receive a dial tone from the PSTN 18 and dial a calling card access number to access the gateway selection server 20 with voice communication. Alternatively, the first or second computing devices 204 and 206 may utilize a modem 240 to receive a dial tone from the PSTN 18 and dial an access number on a calling card to access the gateway selection server 20 for data communication.

For example, using a calling card and the calling card system 10, the first computing device 204 may be a laptop operated for data communication by an employee of a corporation. The first computing device 204 of this example may be used to access the private communication network 216 via the public network 208. The second computing device 206 may be, for example, an Internet workstation accessing the public network 208 for data communication with a calling card and the calling card system 10.

Similarly, the third computing device 216 may be a laptop computer utilizing broadband access to the public network 208 such as T1 link, cable television, etc. A user of the third computing device 216 may advantageously use the calling card system 10 when traveling outside the broadband access area provided by the user's service agreement. Using a pre-paid or post-paid calling card the user of the third computing device 216 may communicate either voice or data communication over the public network 208. Accordingly, the user may minimize long distance charges without long term obligations while obtaining the benefit of anytime, anywhere access to voice and/or data communication using the calling card system 10.

In a retail environment, consumers may purchase a pre-paid calling card for the calling card system 10. A consumer may obtain an access number and an authorization code, such as a PIN, from the calling card to utilize the calling card system 10. Such a subscriber may place a call with the telephone 202 to the PSTN 18 using the access number. The call may be routed to the service selection gateway 20. Following authentication by the call processor 232 using the authorization code and the database 234, the user may be provided an account balance, such as the available time left on the account. The user may then select between voice communication and data communication over the public network 208.

For voice communication, the user may be prompted to enter a destination telephone number. The call processor 232 may then select between transmission over the PSTN 18 and the public network 208 to deliver the call to the identified destination. The selection may be based on determined parameters that may be evaluated by the call processor 232. Upon selection of data communication over the public network 208, the call processor 232 may request geographic location information from the user, such as an area code and phone number. Alternatively, the geographic location of the user may be ascertained from available information. Available information may be provided from the PSTN 18 and/or the telephone 202, such as information provided by calling line identification (CLID).

Based on the determined geographic location, the call processor 232 may determine the optimum dial up number to access the public network 208. As used herein, the term "optimum dial up number" refers to a destination telephone number chosen by the service selection gateway 20 for data communication over the public network 208. The optimum dial up number may be determined based on geographic location and/or associated factors such as cost, available bandwidth or any other parameters/factors associated with communication over the public network 208. The determined optimum dial up number may be the access number of the same or another service selection gateway 20. Alternatively, where such relationships or agreements are in place, the optimum dial up number may be a local phone number providing local access via a local ISP, or any other telephone number providing dial-up access to the public network 208.

The determined optimum dial up number may be provided to the user by the call processor 232 via the PSTN 18. The user may utilize a computing device such as the first or second computing devices 204 or 206 and the modem 240 to place a call to the PSTN 18 with the optimum dial up number. When the optimum dial up number is for a service selection gateway 20, the PSTN 18 may route the call to the identified service selection gateway 20. The call processor 232 may then identify the call as data communication and perform authentication. Following authentication, the call processor 232 may direct the data gateway 238 to provide access to the public network 208. Alternatively, the data gateway 238 may route the call to the network access server 210 to access the public network 208.

Where the optimum dial up number identifies a local ISP, the user may similarly place a call to the PSTN 18. The call may be forwarded to the local ISP. The local ISP may authenticate the user using the database 234. In addition, data servers may maintain the accounting with regard to usage of the pre-paid calling card using the database 324.

In another example, the user of a pre-paid calling card may instead utilize the first or second computing devices 204 or 206 to access the calling card system 10. In this example, the user places a call to the PSTN 18 with the access number from a pre-paid calling card. Upon receipt by the service selection gateway 20, the call is identified as data communication. Following authentication, geographic location information may be requested and used to determine if the user has dialed the optimum dial up number. If not, the call processor 232 may provide the optimum dial up number. If the user has dialed the optimum dial up number, access to the public network 208 may be provided via the data gateway 238.

Figure 3:
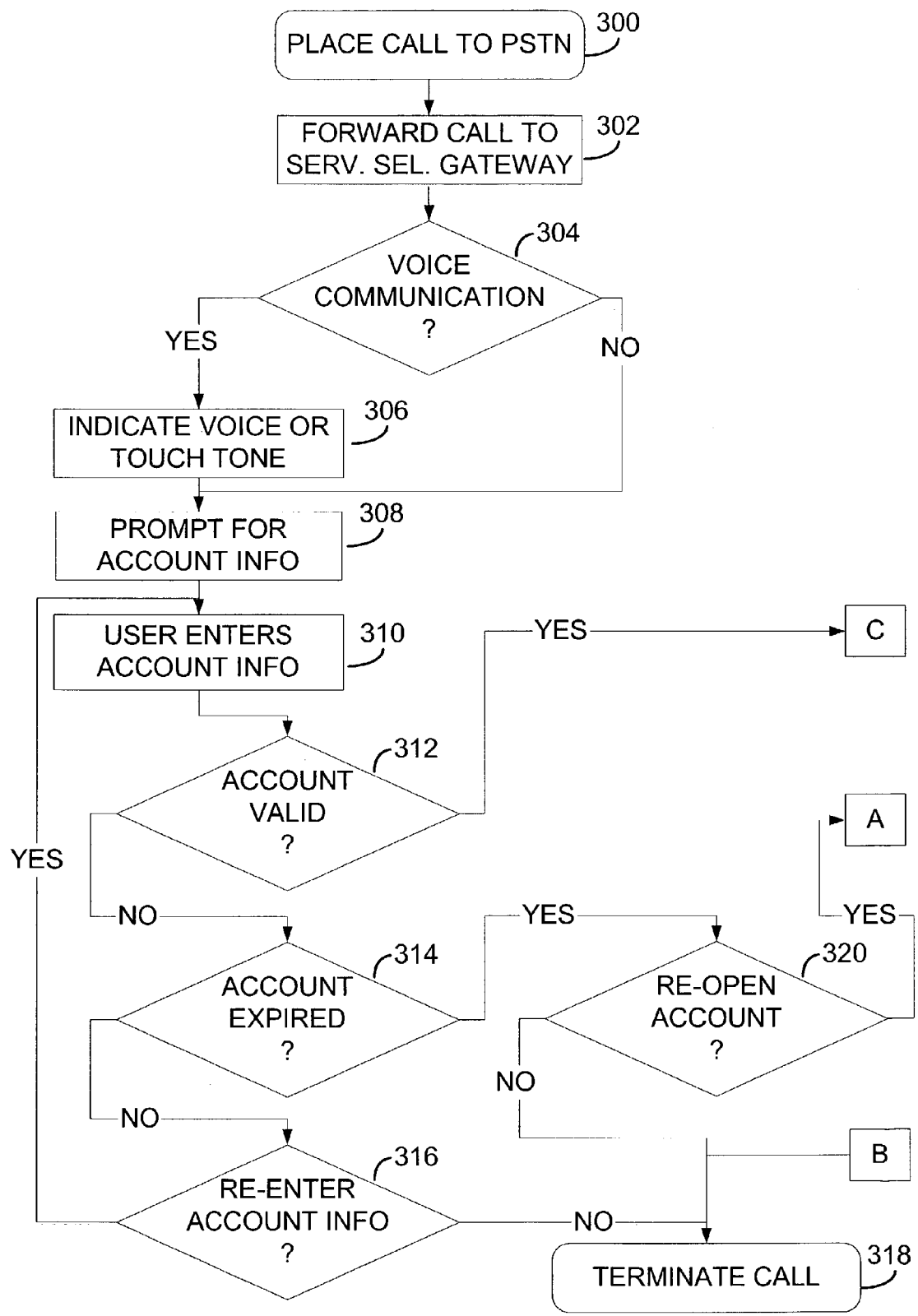
FIG. 3 is a process flow diagram illustrating operation of the calling card system with a pre-paid calling card.

FIG. 3 is a process flow diagram illustrating operation of the calling card system 10 depicted in FIG. 2 with pre-paid calling cards. The operation begins at block 300 when the user places a call with the access number associated with the card to the PSTN 18. At block 302, the call is forwarded to the service selection gateway 20 based on the access number. It is determined whether the call is voice communications at block 304. If yes, IVR is utilized to prompt the user to select either voice responses or touch tone responses at block 306. According to the user's selection, further communication is either based on IVR or touch tone user inputs. At block 308, the user is greeted and prompted for account information from the pre-paid calling card. If at block 304, the call is identified as data communication, the service selection gateway 20 communicates with text messages and the operation proceeds to block 308 to prompt for account information.

The user enters account information that includes the authentication information from the pre-paid calling card at block 310. At block 312, it is determined if the account is valid by authenticating the user and confirming a current account balance is available. If the account is not valid, it is determined if the account is expired at block 314. If no, the user is queried to re-enter account information at block 316. If the user refuses, the call is terminated at block 318. If the user re-enters the account information, the operation returns to block 310. If at block 314, the account is expired, the user is prompted to re-open the account by re-charging the account balance at block 320. If the user declines, the call is terminated at block 318.

Figure 4:
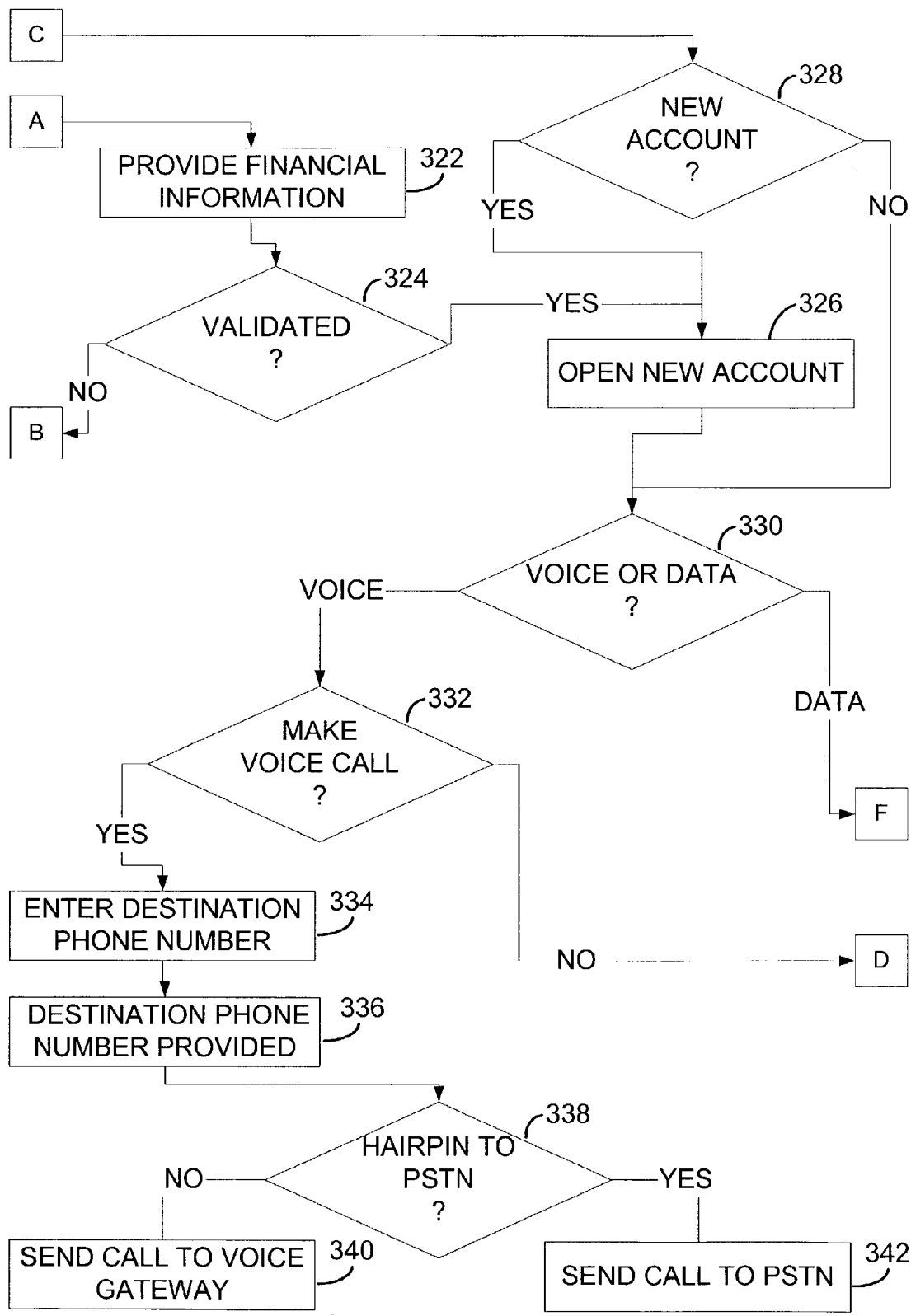
FIG. 4 is second portion of the flow diagram illustrated in FIG. 3.

Referring now to FIG. 4, if the user elects to add funds into the account, the user provides financial information such as credit/debit card information, checking account, etc. at block 322. At block 324, it is determined if the financial information is valid. If no, the call terminates at block 318. If the financial information provided is valid, a new account is activated for the user at block 326.

Figure 5:
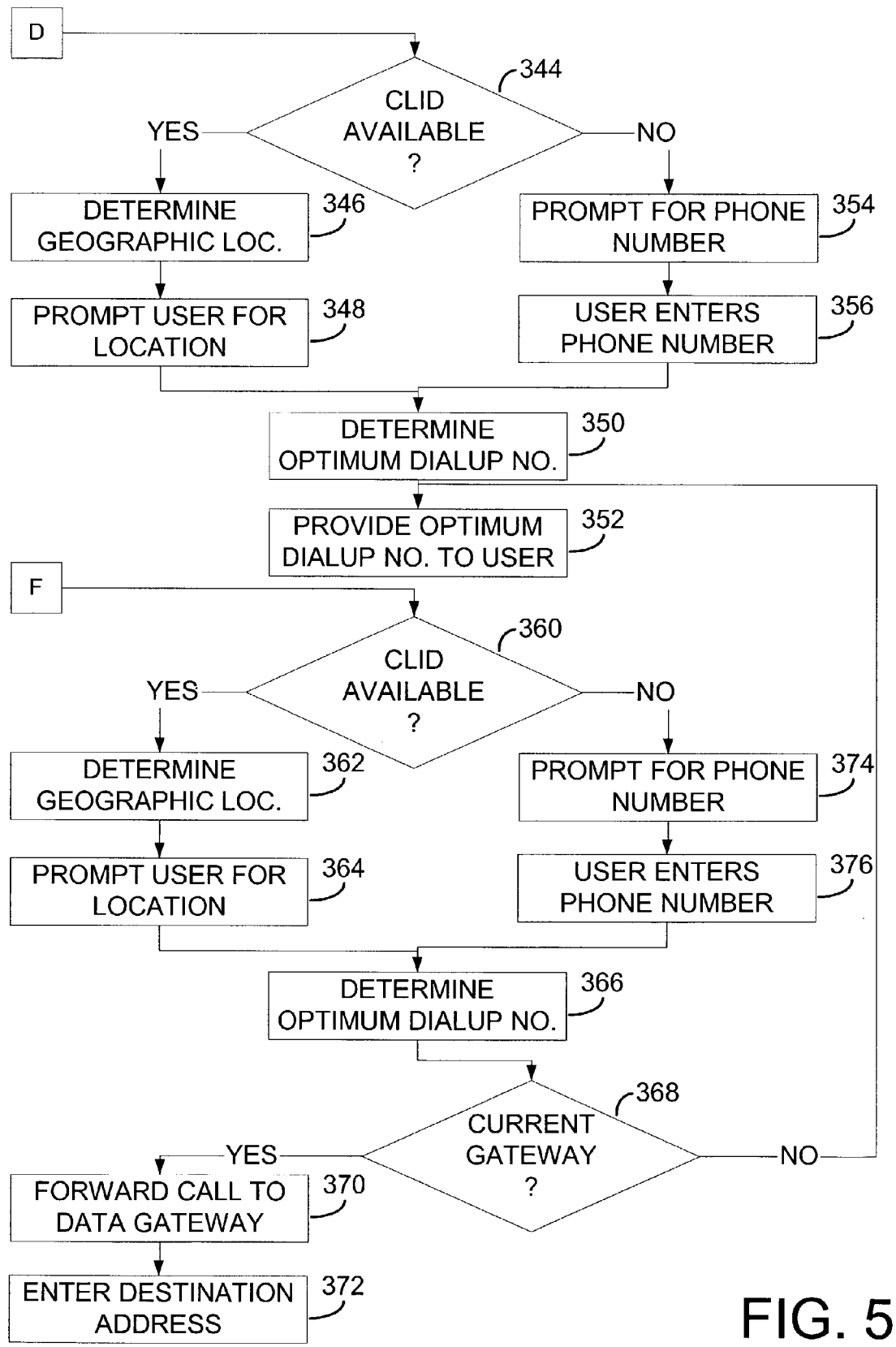
FIG. 5 is a third portion of the flow diagram illustrated in FIG. 3.

Returning to block 312 in FIG. 4, if the account is valid it is determined if the account is a new account at block 328 in FIG. 5. If yes, a new account is set up at block 326. If the account is not a new account, or after the new account is created, the call is confirmed as data communication or voice communication at block 330. If the call is confirmed to be voice communication, the user is queried to make a voice call at block 332. If the user indicates yes, the user is requested to provide the destination phone number at block 334. At block 336, the user provides the destination number. It is determined if the call needs to be hairpinned to the PSTN 18 at block 338. If no, at block 340 the call is sent to the voice gateway 236 for transmission in a network protocol, such as VoIP, over the public network 208. If the call needs to be hairpinned, the call is sent back to the PSTN 18 for transmission to the destination through the PSTN 18 at block 342.

Returning to block 332, if the user wishes to perform data communication, the operation proceeds to FIG. 5 where it is determined if CLID is available at block 344. If yes, the user's geographic location is determined from CLID at block 346. At block 348, the user is prompted for the geographic location in order to validate the determined geographic location. Following validation, the optimum dial in number is determined based on the geographic location at block 350. At block 352, the optimum dial in number is provided to the user. The operation commences again at block 300 when the user makes a call to the PSTN 18 with the optimum dial in number provided and the authentication information from the pre-paid calling card.

If at block 344 CLID is not available, the user is prompted to enter an area code and phone number to identify the geographic location at block 354. At block 356, the user provides the area code and phone number and the operation returns to block 350 to determine and provide the optimum dial in number and then terminate the call at block 318.

Referring again to block 330 in FIG. 4, if it is confirmed that the call is data communication, the operation proceeds to block 360 of FIG. 5 to determine if CLID is available. If yes, the user's geographic location is determined from CLID at block 362. At block 364, the user is prompted for a geographic location in order to validate the determined geographic location. The optimum dial in number is determined based on the geographic location at block 366.

At block 368, it is determined if the optimum dial in number is the access number of the service selection gateway 20 currently handling the call. If yes, the call is forwarded to the data gateway 238 at block 370. At block 372, the user enters a destination address such as a uniform resource locator (URL) address to communicate with a device over the public network 208. If at block 368, the optimum dial in number is not the current service selection gateway 20, the operation returns to block 350 and the optimum dial in number is provided to the user. The operation commences again at block 300 when the user places a call to the PSTN 18 using the optimum dial in number and the authentication information from the pre-paid calling card.

If at block 360 CLID is not available, the user is prompted to enter an area code and phone number to identify the geographic location at block 374. At block 376, the user provides the area code and phone number and the operation returns to block 366 to determine the optimum dial in number and compare the determined optimum dial in number to the access number of the service selection gateway 20.

Referring again to FIG. 2, when post paid calling cards are utilized in the calling card system 10, such as, in a business environment, the calling cards may provide cost effective and efficient access to the private communication system 218. The calling card system 10 may utilize both voice and data virtual private networks (VPNs) to securely make available resources and services otherwise available from within the private communication system 218 or via dialup modem to the private communication system 218. Accordingly, employees who are traveling or are otherwise away from their home base may utilize voice and data communications as if that employee were sitting at their desk within the private communication system 218. For example, employees may utilize voice communication with a post paid calling card when away from their home base to access services of the PBX 224 as an off-premises extension. In addition, post paid calling cards may provide data communication access to the private network 212 via a virtual private network formed with a local dial up number. As such, long distance communication costs as well as internal modem bank management costs within the private communication system 218 may be minimized.

Within the calling card system 10, business organizations may be provided secure tunnel capability with the NAS 210. Secure tunneling capability may be used to establish a secure pathway with protocols such as layer 2 tunneling protocol (L2TP), secure IP (IPSec), etc. The secure pathway may extend through the public network 208 to the VPN server 214 within the private communication system 218. The NAS 210 may be directed by the voice gateway 236 or the data gateway 238 to generate the secure pathway to the VPN server 214.

Direction from the voice gateway 236 or the data gateway 238 may be based on authentication of the identity of the user. The authentication may include authentication that the user accessing the calling card system 10 with a post paid calling card is affiliated with a business organization with secure tunneling privileges. Authentication may be performed by the call processor 232 utilizing the database 234 when a call is forwarded from the PSTN 18 to the service selection gateway 20 as previously discussed.

Alternatively, the user of a post-paid calling card may be authenticated by the NAS 210. Authentication by the NAS 210 may be similar to the previously discussed pre-paid calling card authentication. The NAS 210 may also recognize the user as part of a business organization with secure tunneling privileges as part of the authentication. Authentication and recognition by the NAS 210 may be performed, for example, when the user places a call to the PSTN 18 with an optimum dial up number and provides authentication information associated with the users post paid calling card. The optimum dial in number may indicate to the PSTN 18 that the call should be forwarded to an ISP. As previously discussed, when a call is placed for data communications utilizing a calling card, the service selection gateway 20 may determine that the optimum dial up number is for an ISP.

Following authentication of the user, a secure pathway may be established between the NAS 210 and the VPN server 214. Once the secure pathway is built, the user may again be authenticated. Instead of authentication based on the post paid calling card, this time the user may be authenticated by infrastructure within the private communication system 218. Accordingly, the authentication may be based on information maintained by the private organization, such as, employee ID numbers, user IDs, login passwords, etc.

For data communication, upon reaching the private communication system 218, the authentication infrastructure may present the user with a private network login screen. The private network login screen may be similar to the screen presented for login within the private communication system 218. The user may be presented with a similar login screen since the connection at the private communication system 218, such as a point-to-point protocol (PPP) connection, may be terminated by PPP aggregation devices within the VPN server 214.

For a call that is voice communication, communication over the secure pathway may pass through the VPN server 214 and be terminated at the integrated access device (IAD) 220. Such communication may be with a network protocol such as VoIP. The PBX 224 within the communication system 216 may similarly perform authentication of the user utilizing information maintained by the private organization. When a user is provided a first dial-tone and places a call for voice communication to the PSTN 218, the user may first be authenticated with the service selection gateway 20 based on the post paid calling card as previously discussed. In addition, based on recognition that the user is with a private organization with secure tunneling privileges, a secure tunnel may be built.

Upon securely tunneling the call to the private communication system 218, the user may again be authenticated with the PBX 224 using the authentication infrastructure of the PBX 224. The authentication infrastructure may, for example include entry of a user telephone extension and PIN number, an employee ID, a voice mailbox number, etc. Upon successful authentication, the user may be presented with a second dial tone from the PBX 224 that allows access to most services of the PBX 224 as if the user was sitting in the office within the private communication system 218. The VPN server 214 may also be provided with trunks to a local PBX (not shown) for off premise extension (OPX) services. The integrated access device (IAD) 220 may also provide off premise extension (OPX) services.

Using the post paid calling card, users within a private organization may utilize a secure communication pathway over the public network 208 to the private communication system 218 of the private organization. Alternatively, the calling card system 10 may provide access to the private communication system 218 without secure tunneling. In this scenario, the private communication system 218 may be accessed with a destination address similar to any other destination as previously discussed. In either case, the calling card system 10 may minimize long distance charges by providing local access to the public network 208 via the PSTN 18 from any geographic location of the user. In addition, the calling card system 10 may maintain accounting and other administrative functions for the private organization.

The calling card system 10 may also provide access to both the private communication system 218 over a secure pathway and voice and data communications to any destination over the public network 208. Once a call is placed to the PSTN 18 using a post paid calling card, the identity of the user may be authenticated and the communication services available to the user determined. The user may select between services for a secure pathway for voice and data communication to a private communication system 218 or non-secure communications to any other destination. The call processor 232 may identify the available services and selectively enable both secure and non-secure communication over the public network 208 via the voice and data gateways 236 and 238.

Accounting for both secure and non-secure communication services may be administered with the service selection gateway 20. Usage of the post paid calling card for voice and data communication to the private communication system 218 with secure tunneling may be reflected in the account of the private organization. Usage of the post paid calling card for voice and data communication over the public network 208 to other destinations may be reflected in an account of the user. Accordingly, the post paid calling card may provide voice and data communication capability for communication related to the private organization as well as the individual user.

For example, a user who is an employee in a corporation may utilize the post paid calling card for corporation business as well as for personal use. In this example, the corporation may receive account statements indicating the employee's usage of the calling card to access the private communication system 218 of the corporation. The employee may similarly receive account statements reflecting private use by the employee for phone calls and access to the public network 208, such as Internet access.

Figure 6:
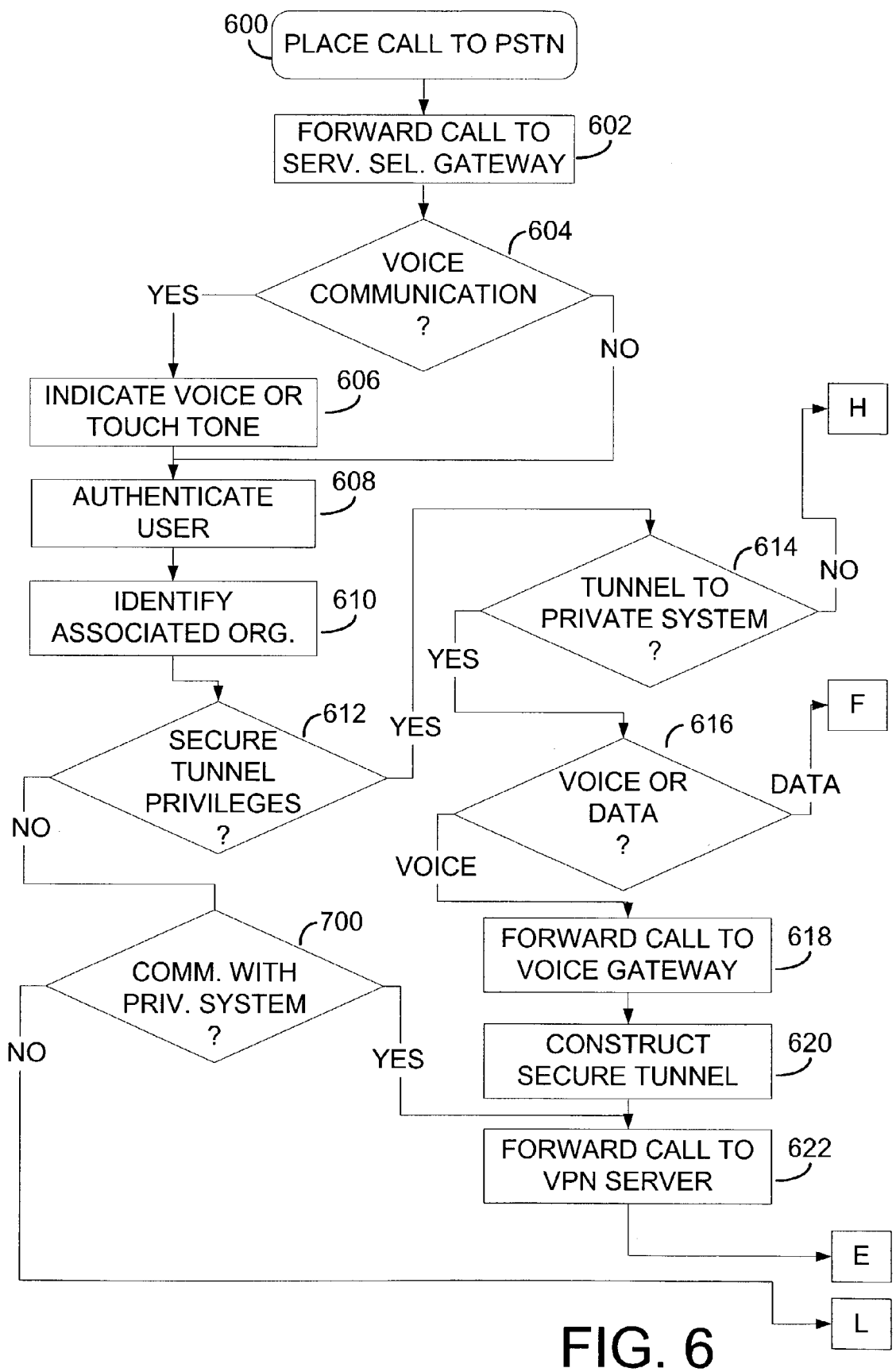
FIG. 6 is a process flow diagram illustrating operation of the calling card system with a post paid calling card.

FIG. 6 is a process flow diagram illustrating operation of the calling card system 10 depicted in FIG. 2 with post-paid calling cards. Similar to the previous operation described with reference to FIG. 3, users may place calls to the PSTN 18 for voice or data communication over the public network 208. The operation begins at block 600 when the user places a call with the access number associated with the post paid calling card to the PSTN 18. At block 602, the call is forwarded to the service selection gateway 20 based on the access number.

It is determined whether the call is voice communications at block 604. If yes, the user is prompted to select either voice responses or touch tone responses at block 606. At block 608, the identity of the user is authenticated based on the post paid calling card. If at block 604, it is determined that the call is data communications, text messages are used and the user is authenticated at block 608. At block 610, the user is identified as associated with a private organization.

It is determined if the private organization has secure tunneling privileges at block 612. If yes, at block 614 the user is given the option of tunneling to the private communication system 218 of the private organization or selecting another destination. If the user elects to tunnel to the private communication system 218, at block 616, it is confirmed whether the call is voice communication or data communication. If the call is voice communication, the call is forwarded to the voice gateway 236 at block 618. The voice gateway 236 enables construction of the secure tunnel to the VPN server 214 at block 620. At block 622, the call is forwarded to the VPN server 214.

Figure 7:
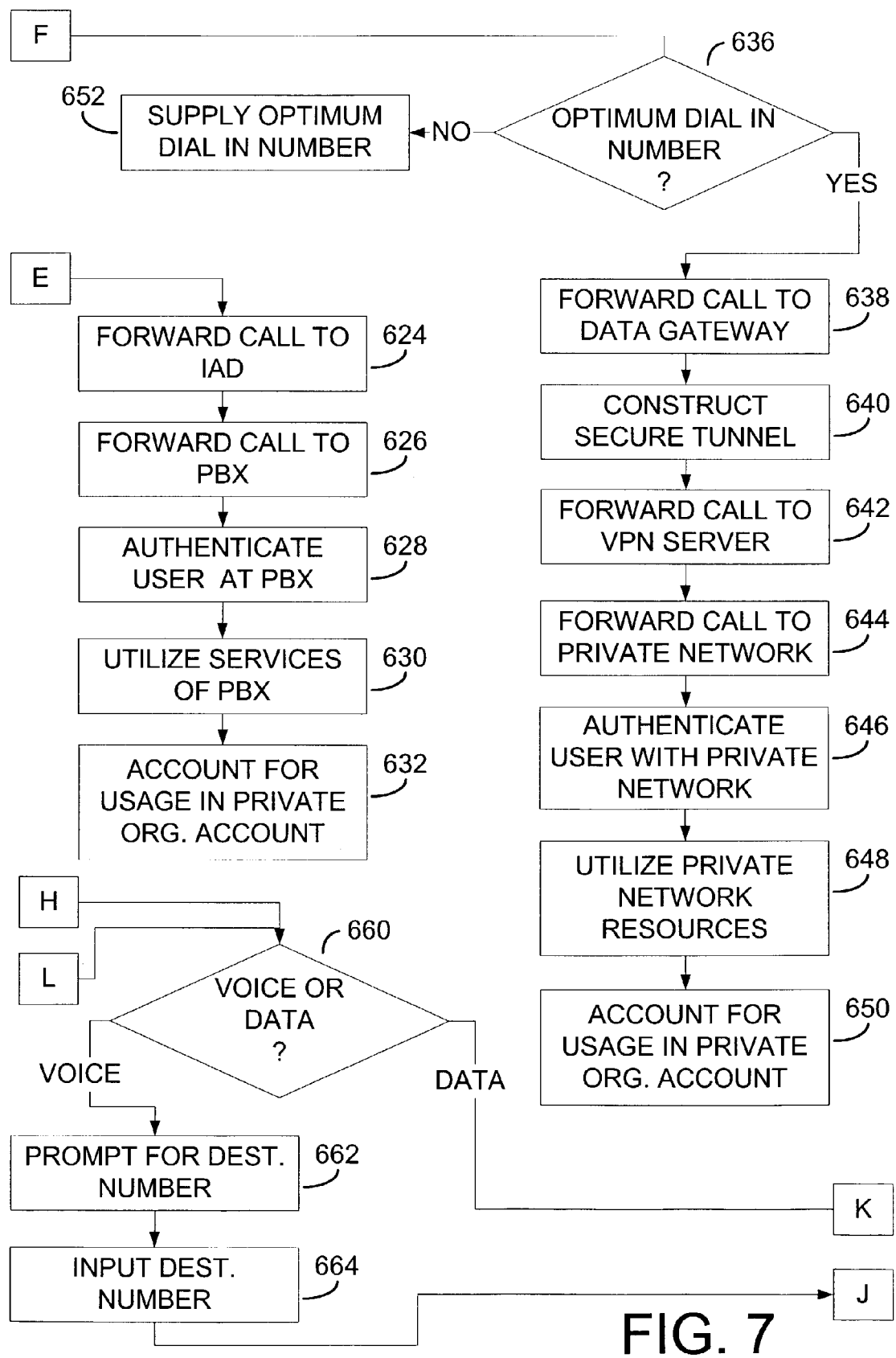
FIG. 7 is second portion of the flow diagram illustrated in FIG. 6.

Referring now to FIG. 7, the VPN server 214 forwards the call to the integrated access box 220 at block 624. At block 626, the integrated access box 220 forwards the call to the PBX 224. The PBX 224 authenticates the user based on information within the private organization at block 628. At block 630, the user is then free to utilize the voice services available from the PBX 224 as if the user is utilizing the organization telephone 226 in the private communication system 218. The communication services provided to the user are reflected in the account of the private organization at block 632.

Returning to FIG. 6, if at block 616, the call is data communication, the operation returns to FIG. 7 where it is determined if the optimum dial in number based on geographic location is the access number of the current service selection gateway 20 at block 636. Determination of the optimum dial in number may be performed similar to blocks 360-376 described with reference to FIG. 5, and is therefore not repeated. If the access number of the current service selection gateway 20 is the optimum dial in number, the call is forwarded to the data gateway 238 at block 638. At block 640 the data gateway 238 constructs a secure tunnel to the VPN server 214 in the private communication system 218.

The call is forwarded to the VPN server 214 at block 642. At block 644, the VPN server 214 forwards the call to the private network 212. The infrastructure within the private network 212 authenticates the user based on information within the private organization at block 646. At block 648, the user utilizes available resources and operates within the private network 212 as if the user and communication device 16 are within the private communication system 218. At block 650, the communication services provided to the user are reflected in the account of the private organization.

When the access number of the current service selection gateway 20 is not the optimum dial in number at block 636, the optimum dial number is provided to the user at block 652. When the user again makes a call to the PSTN 18 with the optimum dial in number, the operation commences again at block 600.

Referring again to block 614 of FIG. 6, if the user elects not to tunnel to the private communication system 218, the call processor 232 confirms the call is voice communication at block 660 of FIG. 7. If the call is confirmed to be voice communication, the user is prompted for a destination telephone number at block 662. At block 664, the user inputs the destination telephone number.

Figure 8:
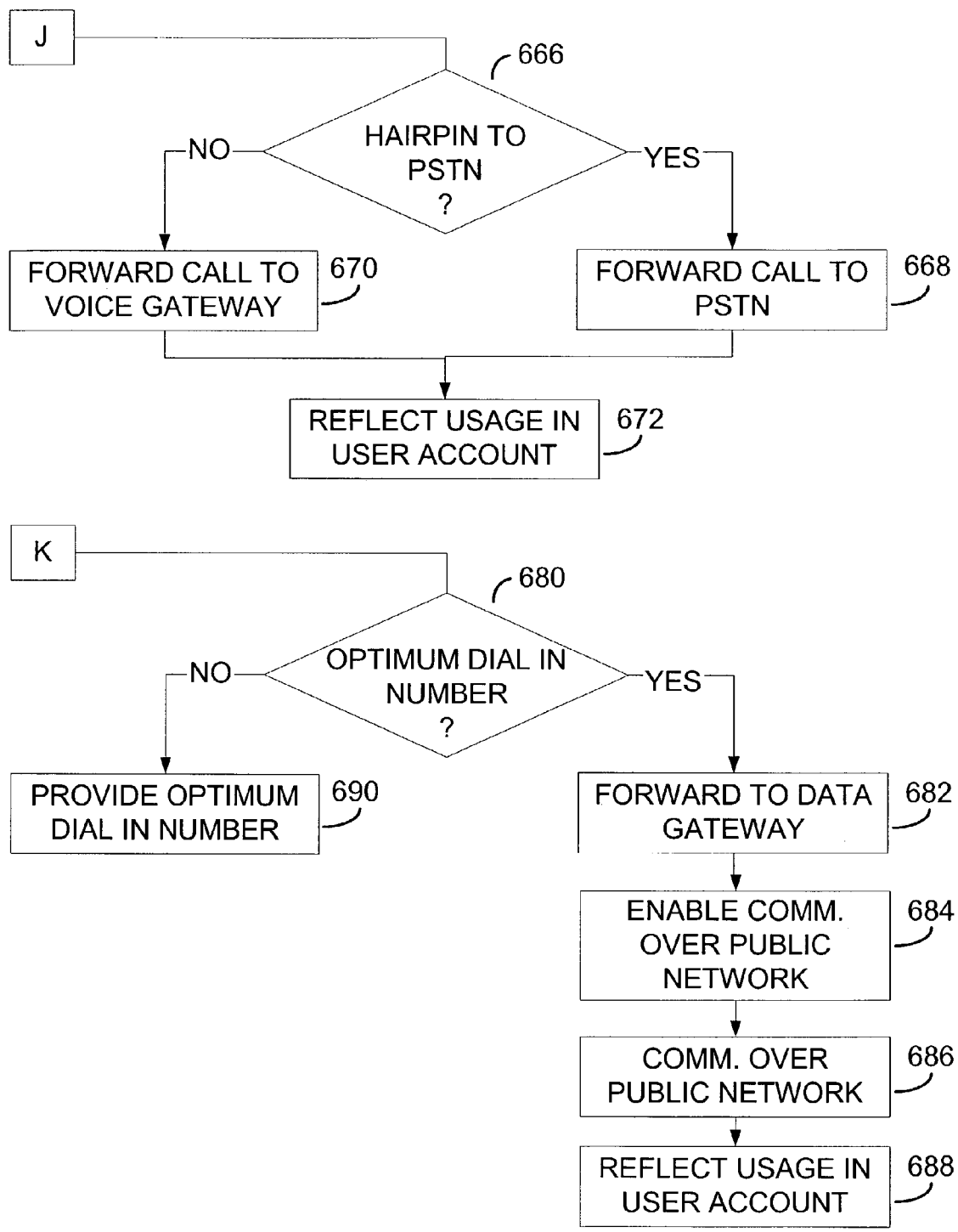
FIG. 8 is a third portion of the flow diagram illustrated in FIG. 6.

Referring now to FIG. 8, it is determined whether to hairpin the call to the PSTN 18 at block 666. If yes, the call is forwarded to the PSTN 18 for transmission to the destination via the PSTN 18 at block 668. If no, the call is forwarded to the voice gateway 236 for transmission over the public network 208 at block 670. At block 672, the communication services provided to the user are reflected in the account of the user.

If at block 660 of FIG. 7 the call is confirmed as data communication, it is determined if the access number of the current service selection gateway 20 is the optimum dial in number at block 680 of FIG. 8. If yes, the call is forwarded to the data gateway 238 at block 682. At block 684, the data gateway 238 enables data communication over the public network 208. The user enters a destination address such as a uniform resource locator (URL) address and communicates over the public network 208 at block 686. At block 688, the communication services provided are reflected in the account of the user. If at block 680 it is determined that the access number of the current service selection gateway 20 is not the optimum dial-in number, the optimum dial in number is provided to the user at block 690. The operation returns to block 600 when the optimum dial in number is included in a call placed to the PSTN 18 by the user with the post paid calling card.

Returning again to block 612 of FIG. 6, if the user does not have the secure tunneling privilege, the user is queried to communicate over the public network 208 to the private communication system 218 of the private organization at block 700. If the user elects to communicate with the private communication system 218, the operation returns to block 622 and the call is forwarded to the VPN server 214 as previously discussed. If the user elects not to communicate with the private system at block 700, the operation returns to block 660 of FIG. 7.

The previously discussed calling card system 10 may provide either pre-paid or post paid communication services for both voice and data communication. Users may utilize any communication device capable of communicating with a PSTN to dial an access number associated with a pre-paid or post paid calling card. The PSTN may forward such calls to the service selection gateway based on the access number.

Utilizing a pre-paid calling card, voice communication may be selectively transmitted with a network protocol, such as VoIP over the public network by the service selection gateway. Alternatively, voice communication may be directed back to the PSTN by the service selection gateway and transmitted through the PSTN. Selective transmission of voice data may be determined by the service selection gateway based on determined factors such as cost, availability, etc. Data communication may also be enabled for transmission over the public network by the service selection gateway utilizing pre-paid calling cards. The service selection gateway may minimize long distance costs by identifying an optimum dial in number. The user may minimize long distance calling charges utilizing the optimum dial in number.

Users may also use post paid calling cards with the calling card system. The post paid calling cards may be associated with a private user account and/or a private organization account. Accordingly, depending on the destination of the voice and data communication, the calling card system may reflect communication services provided to the user in either the user's account or the private organization's account. The calling card system also includes the capability to provide a secure pathway to a private communication system of a private organization for both voice and data communication. As such, a user may access the services and functionality within the private communication system from anywhere while being treated by the private communication system as if they were within the private communication system of the private organization.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A calling card system for communication devices capable of transmitting both voice and data communication over a public network, the calling card system comprising:
   - a PSTN capable of communication with communication devices; and
   - a service selection gateway in communication with communication devices via the PSTN, wherein the service selection gateway is operable to identify communication from the communication devices as one of voice communication and data communication,
      wherein voice communication is selectively forwarded by the service selection gateway to one of a public network and the PSTN,
      wherein the service selection gateway is operable to provide voice communication forwarded to the public network in a voice based network protocol that is transmittable over the public network,
      wherein the data communication is transmitted over the public network in a data network protocol by a data gateway within the service selection gateway.

2. The calling card system of claim 1, wherein the service selection gateway is operable to selectively transfer the voice communication as a function of at least one of availability, network bandwidth and cost.

3. The calling card system of claim 1, wherein the voice based network protocol is a voice over Internet protocol.

4. The calling card system of claim 1, wherein access to the service selection gateway is requested with an access number of a calling card, wherein the access number is submitted to the PSTN by placement of a call with communication devices.

5. The calling card system of claim 1, further comprising a private communication system, wherein the service selection gateway is operable to selectively enable construction of a secure tunnel to the private communication system for voice and data communication over the public network.

6. The calling card system of claim 1, wherein the service selection gateway also includes a database, wherein the transmission of data communication and voice communication is enabled following authentication of the identity of a communication device user with the database.

7. The calling card system of claim 6, wherein the database is operable to store at least one of user account information, calling card account balances and authentication information.

8. A method of using a calling card system for communication devices to transmit voice and data communication over a public network, the method comprising:
   a) placing a call from a communication device through a PSTN to a service selection gateway;
   b) submitting identifying information to the service selection gateway via the communication device;
   c) identifying the call as one of voice communication and data communication with the service selection gateway;
   d) routing the call through one of the PSTN and a public network with the service selection gateway when the call is voice communication, wherein the call is routed through the public network in a voice based network protocol; and
   e) selectively routing the call over the public network with a data gateway within the service selection gateway when the call is data communication.

9. The method of claim 8, wherein a) comprises forwarding the call to the service selection gateway as a function of an access number from a calling card, wherein the access number is included in the call.

10. The method of claim 8, wherein b) comprises authenticating a communication device user at the service selection gateway with the identifying information.

11. The method of claim 8, wherein d) comprises one of hairpinning the call back to the PSTN and providing the call in the voice based network protocol with the service selection gateway.

12. The method of claim 8, wherein d) comprises selecting between secure tunneling to a private communication network and entering a destination phone number when the voice communication is routed through the public network.

13. The method of claim 8, wherein e) comprises selecting between secure tunneling to a private communication network and entering a destination address.

14. The method of claim 8, wherein e) comprises the initial act of confirming that an access number of the service selection gateway is an optimum dial in number.

15. The method of claim 14, further comprising f) identifying the optimum dial in number based on a geographic location of a communication device user.

16. The method of claim 15, further comprising providing the dial in number of a network access server to the communication device user when the network access server is closer to the geographical location of the communication device user.

* * * * *